UNITED STATES PATENT OFFICE.

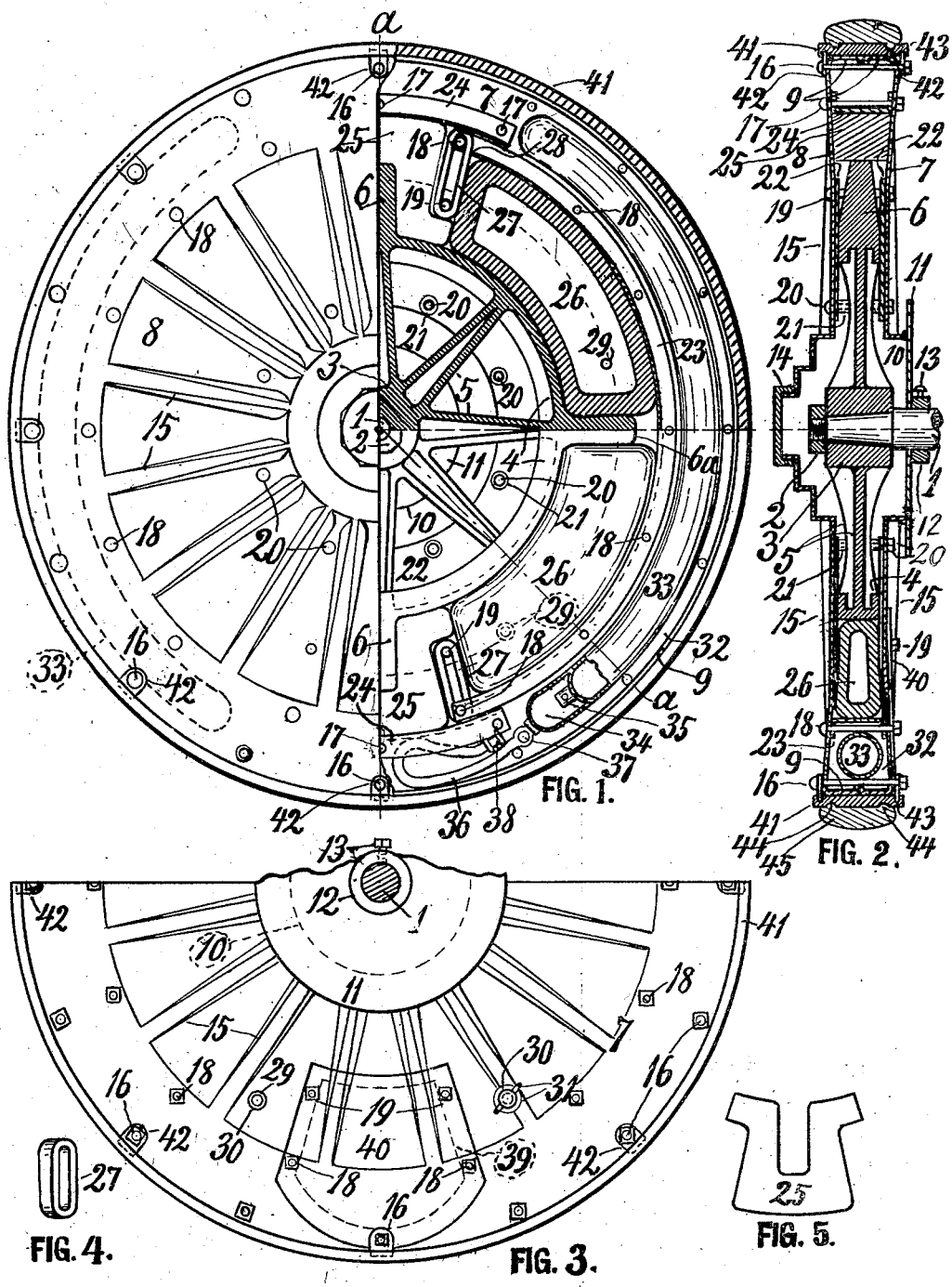

EMILIO BRONIMANN, OF SANTA ROSALIA, CHIHUAHUA, MEXICO.

CUSHIONED WHEEL.

1,065,915.
Specification of Letters Patent.
Patented July 1, 1913.

Application filed December 7, 1911. Serial No. 664,486.

*To all whom it may concern:*

Be it known that I, EMILIO BRONIMANN, a citizen of Mexico, residing at Santa Rosalia, in the State of Chihuahua, Mexico, have invented a new and useful Cushioned Wheel, of which the following is a specification.

My invention relates to supporting wheels for vehicles of all descriptions including bicycles, automobiles, buggies, hacks, wagons, &c., and the main object is to provide an improved wheel having internal cushions which serve the purpose of external pneumatic tires which are apt to get punctured, and of the various forms of springs usually arranged to act as cushions between the axles and the body of vehicles. The improved wheel may also serve as a belt tightener in machinery by using it either as a driving or driven pulley or as a roller against one of the runs of a belt.

Another object is to provide a wheel having pneumatic tires or other cushions with a supply of compressed air from which the cushions may be kept fully and quickly inflated without carrying and using a pump for that purpose.

A third object is to provide a wheel having large pneumatic cushions and smaller solid cushions which in case the pneumatic cushions should get injured may be used until the pneumatic cushions can be repaired or replaced by new ones.

In the accompanying drawing, Figure 1 is a partly sectional side elevation of the outer side of my improved wheel, the right hand half of the outer shell of the wheel is broken away to expose the inside parts of the wheel, and of said parts the hub section and pneumatic cushion in the upper one-fourth of the wheel are shown in section, and the compressed air reservoir is partly in section near the bottom of the view. Fig. 2 is a section of the wheel as on the line *a—a* in Fig. 1 with a solid rubber tire added. Fig. 3 is an inner side elevation of the lower one half of the wheel, looking as from right to left in Fig. 2. Fig. 4 is a perspective detail view of one of the skeleton blocks 27 shown in Fig. 1. Fig. 5 is a detail view of one of the emergency cushions 25 shown in Fig. 1.

Referring to the drawing by reference numerals, 1 designates an end portion or skein of a vehicle axle upon which is retained by a nut 2 the hub 3 of the hub section of the wheel; the hub may be loose on the axle or fixed on it so as to either rotate it or be rotated by it, as the case may require. The hub section is formed with an internally channel-shaped ring 4, which is secured to the hub by spokes 5 and is provided upon its periphery with several, in the present instance four, radial arms 6 and 6ª.

Surrounding the hub section is a felly section composed of two disks or half-shells 7 and 8, having meeting rims 9 forming the felly of the wheel. The half-shell 7, which is next to the vehicle, has a large central opening 10 to permit displacement of the axle as the cushions yield; said opening is closed by a disk 11 having a collar 12 with a set-screw 13 to hold it adjustably on the shaft; the disk may or may not be secured to the collar.

The outer half shell 8 is provided with a central opening which is closed by a removable cap 14, which may be screw-threaded upon the projecting portion of the shell. Both half-shells are reinforced by radial ribs 15, and are secured together by several circular rows of bolts 16, 17, 18, 19, and 20, of which the bolts 20 are provided with bushings 21 by which to hold against the half shells two annular wearing plates 22 for the hub section to glide between.

Upon the bolts 18 are held two almost semicircular ring sections 23, which are channel-shaped in cross section, and are supplemented by shorter ring sections 24, held by the bolts 17 in such positions that they close the gaps between the ends of the main sections, but being disposed farther from the center of the wheel than the main sections, which they partly overlap, spaces are formed for two U-shaped soft but preferably solid rubber cushions 25, which embrace the radial arms 6.

Inserted between the ring or members 23 of the felly section, and the ring 4 of the hub section are four segmental pneumatic cushions 26, each of which has one end supported by one of the radial arms 6ª and the other end by the block 27, which may be skeletoned as shown, and is inserted in a gap 28 in the end of the member 23 and has one end secured on one of the bolts 18 and the other end on one of the bolts 19; thus the blocks 27 support both the cushions 25 and the cushions 26. Each cushion 26 is provided with an aperture 29 having a valve of the ordinary kind that is closed by the internal air pressure and opened by a greater pressure of air entering through the aperture. In order to easily reach said valved aperture the adjacent shell of the wheel is provided with corresponding apertures 30, (see Fig. 3) which are normally closed by screw plugs 31 (the latter shown to the right but removed in the left of Fig. 3.)

In the annular cavity 32 of the felly section are housed one or more segmentally curved closed steel tubes 33 for carrying highly compressed air; each of said tubes or reservoirs has at one end a reducing chamber 34, into which the air passes from the reservoir through a reducing valve 35, which automatically reduces the pressure to only the highest pressure desired in the cushions 26. The chamber 34 is provided with a hose 36 having a hand-operated valve 37, and at its free end a coupling 38 adapted to connect with the apertures 29 of the cushions 26.

In Fig. 2, and still better in Fig. 3, is shown that the shell of the wheel may be provided with one or more apertures 39, which are closed by lids like 40, secured by screws, or in the present instance by the nuts of some of the bolts 18 and 19. Upon the felly 9 is snugly fitted a tire 41, preferably made of steel and held in place by catches 42, which are secured on some of the bolts 16 and engaging in internal grooves 43 in the tire, as may be seen near the top of Fig. 2. Said tire is formed with external grooves 44 (see bottom of Fig. 2) in which may engage ribs of a solid rubber tire 45, which may be put on to deaden the sound in driving over stone pavements, gravel or other hard surfaces.

In the use of the wheel, the cushions 26 are inserted and inflated with sufficient air pressure to keep the axle normally in the center of the wheel; and the reservoirs 33 are filled with air under a pressure far greater than that in the cushions. The cushions 25 may be placed in the vehicle during all ordinary driving. Should the air in the cushions 26 become depleted, the lid 40 is removed, the hose 36 taken out, attached to the cushions and the valve 37 opened, so as to fill each cushion quickly, one after the other or two opposite cushions at the same time from two reservoirs. If one or more cushions have become leaky or unfit to hold the pressure to a useful extent, such cushions may be removed or not for the time being, but the soft blocks 25 are inserted through the handholes 39 and placed in the positions shown in Fig. 1, until repair or replacing of new cushions 26 can be had. For carrying extra heavy loads the cushions 25 may also remain in the wheel as shown in Fig. 1; and for auto-trucks the cushions 25 may remain in place all the time, and their numbers may be increased, and the hollow cushions 26 may be dispensed with. It is also practical for heavy vehicles to have the cushions 26 of solid rubber, in which case the emergency cushions 25 may be dispensed with. I may also dispense with the chamber 34 and connect the hose directly with the reducing valve and retain the hand-valve 37. Such and similar modifications I consider as falling within the scope and spirit of my invention without showing them in detail.

What I claim is:

A cushioned wheel comprising a hub section having a peripheral ring with radial arms upon its face, a drum-shaped felly section housing the hub section and having annular wearing plates in slidable contact with the sides of the hub section; a support secured within the felly section some distance from the felly and in concentric relation thereto, radial supports fixed within the felly section, and cushions of elastic material inserted between the face of the ring of the hub section, the concentric support and the radial supports in the felly section and the radial arms of the hub section; said felly section having in one side a central opening, an axle considerably smaller than the said opening passed therethrough and into the hub section, an adjustable disk mounted on the axle and closing said opening so as to keep sand and dust excluded from the interior of the wheel, the other side of the felly section having a central opening and a removable lid closing the same, such opening being for access to the end of the axle to provide it with a nut, and for other purposes.

In testimony whereof I affix my signature, in presence of two witnesses.

EMILIO BRONIMANN.

Witnesses:
C. G. MEYER MEDINA,
GREG. M. SOLIS.